United States Patent
Casagrande

(10) Patent No.: US 7,036,232 B2
(45) Date of Patent: May 2, 2006

(54) APPARATUS FOR MONITORING THE RAILS OF A RAILWAY OR TRAMWAY LINE

(75) Inventor: Ettore Casagrande, Badoere Di Morgano (IT)

(73) Assignee: Tecnogamma S.p.A., Badoere di Morgano (IT)

( * ) Notice: Subject to any disclaimer, the term of this patent is extended or adjusted under 35 U.S.C. 154(b) by 0 days.

(21) Appl. No.: 10/258,592

(22) PCT Filed: May 11, 2001

(86) PCT No.: PCT/IT01/00229

§ 371 (c)(1),
(2), (4) Date: Nov. 4, 2002

(87) PCT Pub. No.: WO01/86227

PCT Pub. Date: Nov. 15, 2001

(65) Prior Publication Data

US 2003/0140509 A1    Jul. 31, 2003

(30) Foreign Application Priority Data

May 12, 2000    (IT)    ............................ VE2000A0023

(51) Int. Cl.
*G01C 11/24*    (2006.01)
(52) U.S. Cl. ............................ 33/1 Q; 33/287; 33/651; 356/602; 382/152; 702/159; 15/250.001; 362/280; 362/456
(58) Field of Classification Search .................. 33/1 Q, 33/286, 287, 651, 651.1, 546, 547, 551, 521, 33/DIG. 21, 227, 228; 382/154, 141, 152 XF; 348/139; 702/150–158, 159 XF; 356/3.01–3.07, 356/601, 623, 237, 602; 15/250.001 XF; 362/280 XF, 323, 456 XF
See application file for complete search history.

(56) References Cited

U.S. PATENT DOCUMENTS

| 1,725,117 | A | * | 8/1929 | Walthers ...................... 362/325 |
| 1,850,219 | A | * | 3/1932 | Walthers ...................... 362/280 |
| 3,864,039 | A | * | 2/1975 | Wilmarth ..................... 356/625 |
| 4,040,738 | A |   | 8/1977 | Wagner |
| 4,181,430 | A | * | 1/1980 | Shirota et al. ............. 356/3.06 |
| 4,198,164 | A | * | 4/1980 | Cantor ....................... 356/623 |
| 4,873,740 | A | * | 10/1989 | Vahrenwald et al. ... 15/250.003 |
| 4,915,504 | A | * | 4/1990 | Thurston .................... 356/604 |
| 5,090,329 | A | * | 2/1992 | Theurer ...................... 104/7.1 |
| 5,199,176 | A | * | 4/1993 | Theurer et al. ............... 33/338 |
| 5,301,548 | A | * | 4/1994 | Theurer ....................... 73/146 |
| 5,619,006 | A | * | 4/1997 | Maus .......................... 89/1.1 |
| 5,642,456 | A | * | 6/1997 | Baker et al. ................. 385/140 |
| 6,400,451 | B1 | * | 6/2002 | Fukuda et al. ......... 356/139.09 |
| 6,504,600 | B1 | * | 1/2003 | Kawaguchi et al. ....... 356/4.01 |
| 6,556,945 | B1 | * | 4/2003 | Burggraf et al. ............ 702/159 |

(Continued)

FOREIGN PATENT DOCUMENTS

DE    195 10 560    9/1996

(Continued)

*Primary Examiner*—Christopher W. Fulton
(74) *Attorney, Agent, or Firm*—Hoffman, Wasson&Gitler PC

(57) ABSTRACT

A laser apparatus for monitoring the rails of a railway or tramway line, characterized by comprising at least two measurement units mounted on a railway or tramway carriage and operating at last on the inner part of the two rails, along with said carriage is made to advance, and a unit for processing the signals transmitted by said measurement units, each of which comprises at least one triangulation reading device.

7 Claims, 2 Drawing Sheets

Figure 5:
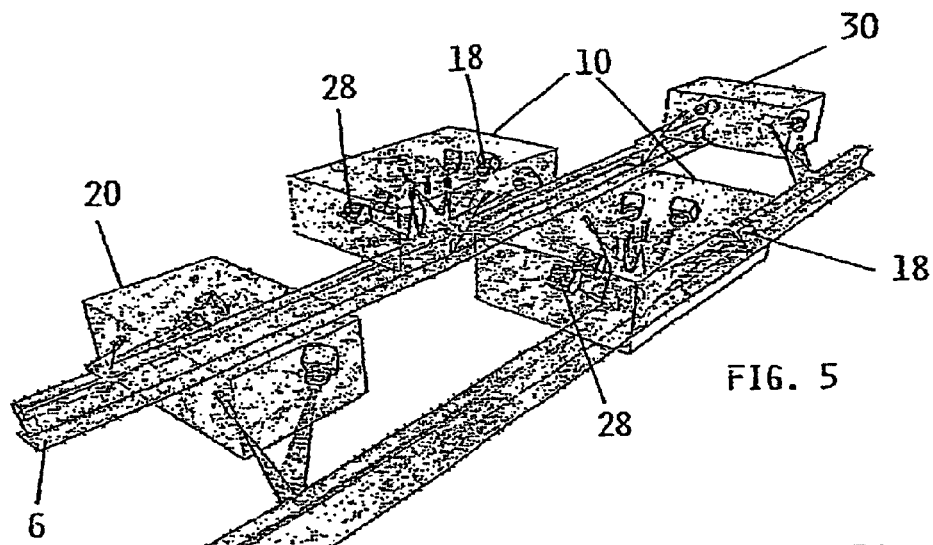

U.S. PATENT DOCUMENTS 6,634,112 B1 * 10/2003 Carr et al. .................. 33/287
6,778,284 B1 * 8/2004 Casagrande ................ 356/614

FOREIGN PATENT DOCUMENTS

| | | | |
|---|---|---|---|
| DE | 19510560 | * | 9/1996 |
| DE | 197 02 072 | | 4/1998 |
| DE | 19702072 | * | 4/1998 |
| DE | 197 21 915 | | 12/1998 |
| JP | 07294453 | | 3/1996 |

* cited by examiner

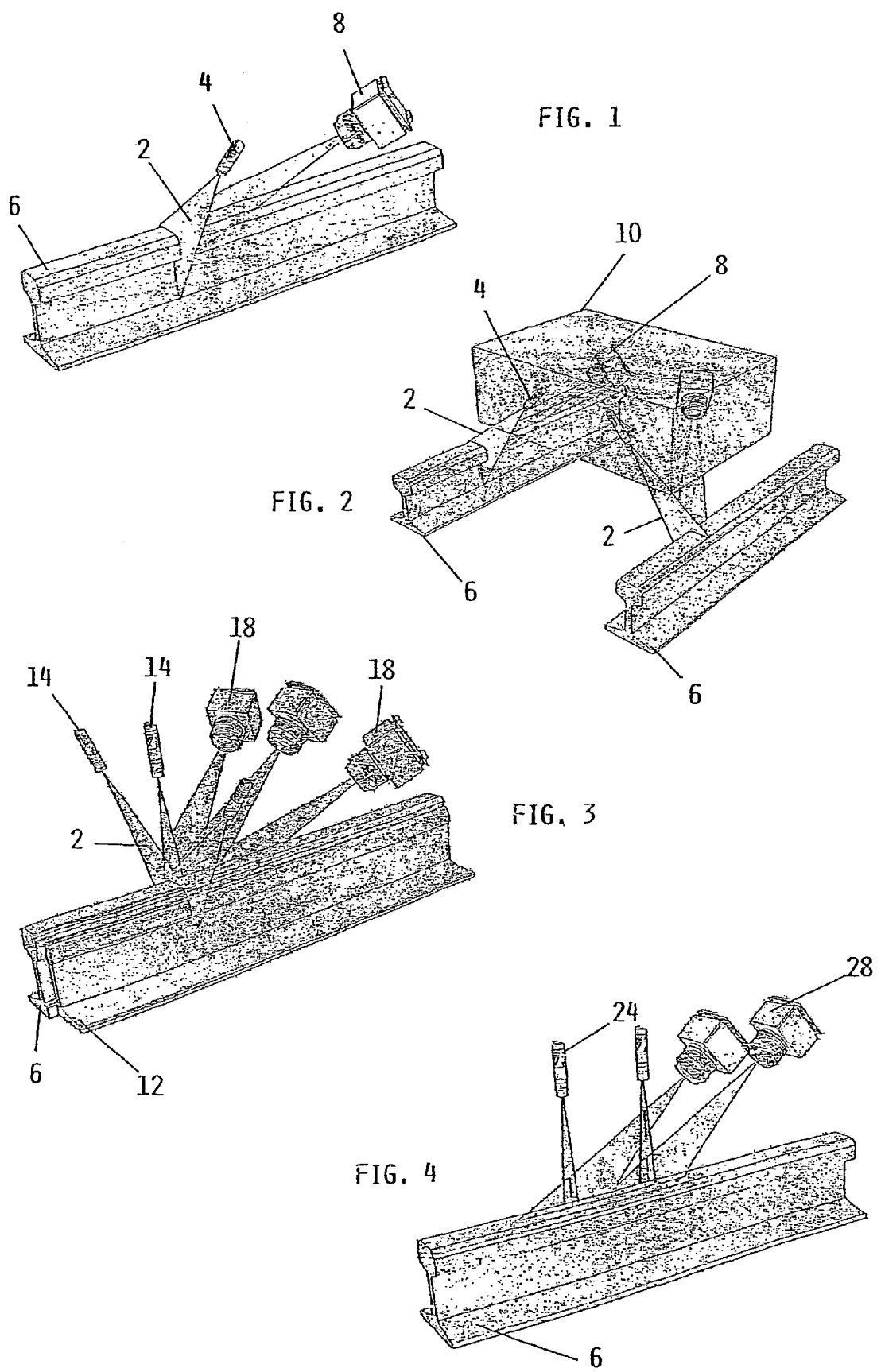

APPARATUS FOR MONITORING THE RAILS OF A RAILWAY OR TRAMWAY LINE

The rails of a railway or tramway line are known to undergo wear and deformation with use, these tending to increase with time until they affect the entire rolling stock with vibration, noise and abnormal stressing, which progressively increase until the rails have to be ground or replaced.

The correct moment at which such work needs to be carried out depends on the extent of the deformation, which can be evaluated by periodic measurements of the rail parameters, using particular contact sensors which however are able to operate only on individual parameters and substantially limit the usability of the measured data.

A general laser measurement method known as triangulation can be used to measure the profile of objects in general without contact.

With this method, the object is struck with a laser light beam, a video camera being used, with its optical axis inclined to the direction of the laser beam, to read the shape generated by the interference between this beam and the object under examination. This method has found many applications in various technical sectors, but has never been applied to the railway or tramway sector to measure the profile of a rail while in movement, and in reality it would seem to be inapplicable, given the specific requirements of this sector and in particular the need to make the measurement while in movement at high speed, the need to measure all the parameters necessary for complete knowledge of the state of the railway or tramway line, and basically the need to handle all its data with a single information technology system to enable an analysis of the correlation between the various data to be achieved. to handle all its data with a single information technology system to enable an analysis of the correlation between the various data to be achieved.

DE-A-19510560 discloses a monitor having at least one light source emitting a narrow beam to illuminate the contours of the rails to be inspected and at least one camera continuously recording and storing image data from the light beam reflected from the rail. The beam lies in a plane at a defined angle to the vertical plane of the rail but the light source is displaced or located sideways and upwards relative to the horizontal contact plane at top of rail surface over an area. The light source and the camera are mounted on a measurement head and the camera is located at a defined angle relative to the vertical plane of the rail and the horizontal contact plane.

An object of the invention is to measure the undulatory wear of the rails.

A further object of the invention is to measure all the parameters of a railway or tramway line without any contact with the rails and without having to use mechanical centering devices.

A particular object of the invention is to acquire information concerning the real profile of the rail, its degree of wear and its vertical and transverse deformation.

Another object of the invention is to be also able to effect these measurements at the points end of a rail.

Another object of the invention is to measure the geometry parameters of the rails, including their difference in height.

Another object of the invention is to effect all the rail measurements with the measurement apparatus insensitive to oscillation and deformation of the vehicle on which it is mounted.

All these and further objects which will be apparent from the ensuing description are attained, according to the invention, by a laser apparatus for monitoring the rails of a railway or tramway line, as described in claim 1.

Figure 6:
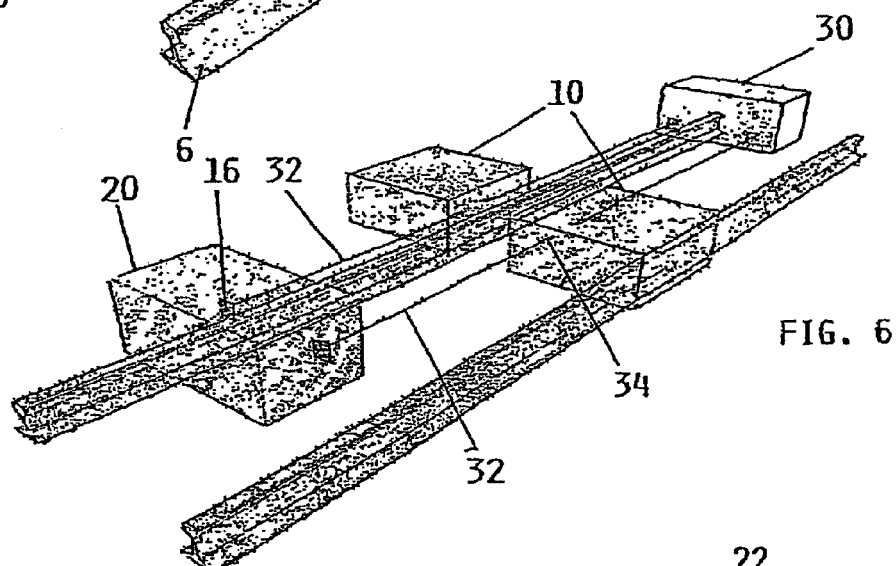
Figure 7:
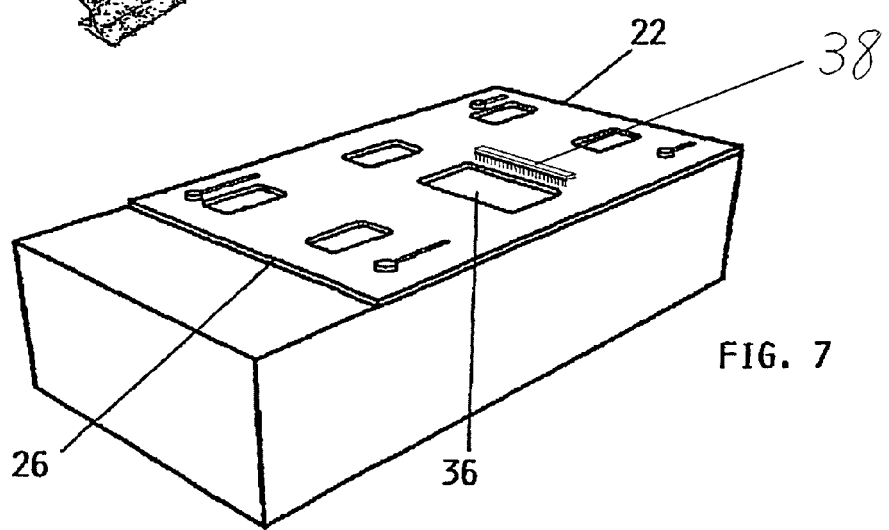

The invention is described in detail hereinafter with reference to the accompanying drawings, in which:

FIGS. 1, 2 and 3 schematically illustrates the principle on which the measurement of the profile of a rail is based according to the prior art;

FIG. 4 schematically illustrates the principle on which the measurement of the undulatory wear of a rail is based according to the invention;

FIG. 5 shows the apparatus of the invention in the embodiment for reading the complete profile of the rails, their undulatory wear and the track geometry;

FIG. 6 schematically illustrates the system for automatically compensating the errors due to the elastic deformation of the frame of the railway or tramway carriage; and FIG. 7 is an external perspective view of a container containing a measurement unit.

As can be seen from the figures, the apparatus of the invention uses the principle of measurement based on optical triangulation obtained with a laser beam and a dot matrix. More specifically, with reference to FIG. 1, the laser beam 2 is generated by a solid state source 4, for example by a cylindrical lens (not shown) able to uniformly distribute the beam 2 and shape it as a lamina.

The interference between the laminar laser beam 2 and the rail 6 displays a line of light related to the rail profile, this latter being read by a special video camera 8 positioned at a certain angle to the laser beam 2 and using a high resolution sensor (1000×1000 pixel) and very high acquisition frequency (100–2000 determinations/second).

The digital signal generated by said video camera 8 and corresponding to the line of interference of the laser beam 2 with the rail 6 is fed to a processor unit which, on the basis of the geometrical parameters of the apparatus, is able to reconstruct the real profile of the rail with high precision.

In its most simple embodiment, shown in FIG. 2, the apparatus of the invention comprises two triangulation reading devices, one for each rail 6, which together form a measurement unit 10 mounted on board a railway carriage, on which the processor unit is also installed. Alternatively, the carriage can be equipped with a recording unit able to memorize the output signals of the two reading devices for their subsequent processing.

The two triangulation reading devices of the described measurement unit 10 are positioned such that the two laser beams 2 emitted by the two sources 4 are focused on the inner side of the two rails 6 and hence display their inner upper bands, i.e. those most significant in determining any deformation and/or wear.

However, in a more complete embodiment, shown in FIG. 3, with each rail 6 there is associated a measurement unit comprising three triangulation reading devices, i.e. three laser sources 14 and three video cameras 18, operating on three different longitudinal bands (inner, upper, outer) of each rail 6, to measure at a predetermined frequency the complete profile of each rail. This embodiment is particularly useful at the points end 12 of the rail 6, i.e. its tapering portion located at the rail switching points.

The real profile of the rail is hence transmitted to the processor unit, which compares it with the theoretical profile to determine the degree of wear of the rail.

In the schematic embodiment shown in FIG. 4, each measurement unit also comprises a further pair of triangulation reading devices positioned longitudinally aligned along each rail 6 and focused on the top of the rail head. In this case the two video cameras 28, which have read the two light profiles obtained by the interference of the two laser beams generated by the two sources 24 with the rail 6, feed the corresponding signals to the processor unit, which using suitable software is able to calculate the derivative of the differential measurement obtained from each of these and hence determine the undulatory wear of the rail.

In this case the two video cameras 28 read the top of the rail profile, to enable the processor unit to analyze the succession of profile parts read with the predetermined frequency and to determine whether the rail contact surface is rectilinear.

In the more complete embodiment of the apparatus of the invention, shown in FIG. 5, on board the railway or tramway carriage there are installed for each rail 6 three reading devices 18 for the transverse profile of the rail, which act on three different longitudinal bands of the rail, and two longitudinally aligned reading devices 28 focused on the top of the rail head and forming with the preceding three a central measurement unit 10. In addition to this, there are provided on the carriage a further two end measurement units, namely a front 20 and a rear 30, preferably positioned at the maximum distance from the central unit 10 compatible with the longitudinal dimensions of the carriage.

The front end unit 20 and the rear end unit 30 each comprises, for each rail 6, a triangulation reading device, which with the corresponding reading device of the central unit 10 is able, with the predetermined frequency, to read at three longitudinally spaced-apart points of each rail the two characteristic coordinates of the point at that instant, i.e. the vertical coordinate, measured on the top of the horizontal surface of the rail, and the horizontal coordinate, measured on the inner vertical wall of the rail head. These two coordinates, which as stated are read at three longitudinally spaced-apart points, enable the processor unit to calculate the various parameters of the track geometry, and in particular:

the gauge,
the radius of curvature,
the horizontal alignment,
the vertical alignment,
the skew.

FIG. 6 shows schematically the principle of compensation for the errors due to elastic deformation of the railway or tramway carriage. With this, the position in height of each triangulation reading device located in the two end measurement units 20 and 30 is monitored by a laser bar 32 emitted by a source 34 positioned in the central measurement unit 10 and received by a sensor 16 positioned in the end measurement unit 20, 30 and able to constitute a precise alignment of the points of measurement. Lack of alignment results in a signal which by means of suitable software is able to automatically compensate the resultant measurement errors.

Each central measurement unit 10 and end measurement unit 20, 30 is preferably contained in a strong metal container (see FIG. 7) provided with brackets for its mounting on the frame of the carriage. The bottom of the container 22, facing the rails 6, is provided with windows 36 for the laser source 4, 14, 24 and for the video cameras 8, 18, 28 the windows being able to be simultaneously closed by a slidable protection screen 26, operated automatically by the system.

To ensure automatic cleaning of the glass plates of the windows 36, with the slidable protection screen 28 there is associated for each window 36 of the container 22 a rubber wiper blade (not visible in the drawings) which with the movements of said screen slides along the corresponding window, to maintain it clean.

From the aforegoing it is clear that the apparatus of the invention is extremely advantageous, and in particular:

it enables the appropriate parameters of a railway line to be measured without any contact with the rails and without the need for any mechanical centering device, by comparing the determined profile of a rail with its theoretical profile it enables the degree of wear and vertical and horizontal deformation to be ascertained, it enables the rail geometry parameters to be measured, it is insensitive to elastic deformation and oscillation of the railway carriage on which it is mounted, and hence effects readings free of errors.

The invention claimed is:

1. A laser apparatus for monitoring the rails of a railway or tramway line, comprising for each rail a measuring unit, provided with triangulation reading devices using a laminar laser beam generated by a laser source and directed towards the rail to be monitored, and a matrix video camera positioned at a certain angle to the laser beam, and further comprising a process unit for processing the signal transmitted by said measurement units, said measurement and processor units being mounted on a railway or tramway carriage made to advance along said railway or tramway line, wherein:

said measurement unit comprises at least two triangulation reading devices positioned aligned along the axis of the respective rail and focused on the top of the rail head, and said processor unit comprises software means able to calculate the derivative of the differential measurement obtained from each of said at least two triangulation reading devices and hence to determine the undulatory wear of the rail.

2. A laser apparatus as claimed in claim 1 wherein each measurement unit further comprises a profile reading device, comprising at least a triangulation device operating at least on the inner part of the respective rail.

3. A laser apparatus as claimed in claim 2 further comprising a central measuring unit, in which said triangulation reading devices are located, and a pair of end measurement units positioned upstream and downstream of said central measurement unit and each comprising at least one profile reading device of the same type as provided in said central unit, to determine together with this latter the track geometry, by processing the signals generated by said profile reading device.

4. An apparatus as claimed in claim 3, further comprising laser signal generators located on the central measurement unit and laser signal sensors located on said end measurement units and operationally associated with said laser signal generators to measure the elastic deformations of the railway or tramway carriage and automatically compensate the resultant measurement errors.

5. An apparatus as claimed in claim 1, wherein each measurement unit comprises a container for the various laser reading devices, which is applicable to the railway or tramway carriage and is provided in its base, which faces the rails, with windows associated with the laser sources and with the video cameras.

6. An apparatus as claimed in claim 5, further comprising a screen in said container, said screen having apertures coinciding with said windows, said screen slidable between two end positions, said apertures face said windows in one of said end positions.

7. A laser apparatus for monitoring the rails of a railway or tramway line, comprising for each rail a measuring unit, provided with triangulation reading devices using a laminar laser beam generated by a laser source and directed towards the rail to be monitored, and a video camera positioned at a certain angle to the laser beam, and further comprising a process unit for processing the signal transmitted by said measurement units, said measurement and processor units being mounted on a railway or tramway carriage made to advance along said railway or tramway line, said measurement unit comprising at least two triangulation reading devices positioned aligned along the axis of the respective rail and focused on the top of the rail head, said processor unit comprises software means able to calculate the derivative of the differential measurement obtained from each of said at least two triangulation reading devices and hence to determine the undulatory wear of the rail wherein each measurement unit comprises a container for the various laser reading devices, which is applicable to the railway or tramway carriage and is provided in its base, which faces the rails, with windows associated with the laser sources and with the video cameras, each measurement unit comprising a container for the various laser reading devices, which is applicable to the railway or tramway carriage and is provided in its base, which faces the rails, with windows associated with the laser sources and with the video cameras, and the screen is provided with wiper blades associated with the various windows of the container and slidable along the screen glass as result of the movement of said screen.

* * * * *